April 29, 1952 C. A. LOVELL 2,594,325

SPACED PULSE IMPULSE SENDER

Filed Aug. 9, 1950 3 Sheets-Sheet 1

INVENTOR
C. A. LOVELL
BY William F. Simpson
ATTORNEY

April 29, 1952 C. A. LOVELL 2,594,325

SPACED PULSE IMPULSE SENDER

Filed Aug. 9, 1950 3 Sheets-Sheet 2

INVENTOR
C. A. LOVELL
BY William F. Simpson.
ATTORNEY

GENERATION OF START PULSES

GENERATION OF PULSES REPRESENTING DIGIT 1

GENERATION OF PULSES REPRESENTING DIGIT 2

GENERATION OF PULSES REPRESENTING DIGIT 0

THE START PULSES AND PULSES REPRESENTING THE DIGIT 2 AS APPLIED TO THE LINE DURING ONE CYCLE OF THE EXITATION CURRENT

INVENTOR
C. A. LOVELL
BY William F. Simpson.
ATTORNEY

Patented Apr. 29, 1952

2,594,325

UNITED STATES PATENT OFFICE 2,594,325

SPACED PULSE IMPULSE SENDER

Clarence A. Lovell, Summit, N. J., assignor to Bell Telephone Laboratories, Incorporated, New York, N. Y., a corporation of New York Application August 9, 1950, Serial No. 178,447

2 Claims. (Cl. 179—90)

This invention relates to improvements in telephone call signal apparatus, circuits, and methods, and more particularly to improvements in telephone call signaling apparatus, circuits, and methods of the types disclosed in Patent 2,499,606 granted to Parkinson on March 7, 1950, which calling apparatus and circuits are of the preset type and generate pulses of electric current which may be transmitted over voice frequency telephone channels.

An object of the present invention is to simplify and reduce the amount of equipment necessary at a subscriber's station for generating electrical signaling currents or pulses of the type required in systems cooperating with the arrangements disclosed in the above-identified Parkinson application.

More particularly, this invention is directed to a subscriber's station in which the complicated relay distributor employing various crystal rectifiers in combination with reed-type relays is replaced by a simple reed relay distributor or stepping circuit and a harmonic generator, all operated by means of power supplied over the subscriber's line.

In the above-identified application of Parkinson, call signal generating apparatus is disclosed for generating pulses in which the magnitude or identity of each digit of the called subscriber's station identification or number is represented by the time elapsing between a start or reference pulse and a stop or digit pulse. In transmitting pulses of short duration over voice frequency transmission paths difficulty is frequently encountered due to transients set up by the pulses. The transients are usually decaying alternating currents which are caused by resonant circuits incorporated in the transmission paths, repeat coils, filters, and other transmission equipment. Transients resulting from the application of short pulses to such equipment frequently last a number of cycles and thus persist for an appreciable interval of time after the exciting pulse has terminated.

In accordance with the invention set forth in the above-identified patent application of Parkinson, the signaling pulses are spaced in time so that ample time is allowed for the transients, associated with or appearing incident to the application of each of the signaling pulses to the transmission system, to die out sufficiently so that they will not interfere with the next signaling pulse. In this manner interaction between the various pulses or between the transients arising incident to one pulse and the succeeding signaling pulse is presented.

In accordance with the above-identified application a plurality of reed-type relays are combined in a distributor circuit with a plurality of crystal rectifiers or diodes to form a distributing circuit which is arranged to advance one step for each half cycle of an applied alternating current.

In accordance with the present invention a simplified relay distributor circuit is provided comprising a plurality of reed-type relays each of which has two windings so proportioned that when alternating currents of two different phases are applied to the respective windings of each of the relays, the relays are actuated at different intervals during each half cycle of the applied alternating current.

In addition a harmonic generator comprising a plurality of saturable cores from the same two phases of alternating current is provided for energizing the high speed pulse generating equipment of the type disclosed in the above-identified application of Parkinson.

The foregoing and other objects and features of the invention will be apparent from the following description, the appended claims and drawings in which:

Figures 1, 2, 3:
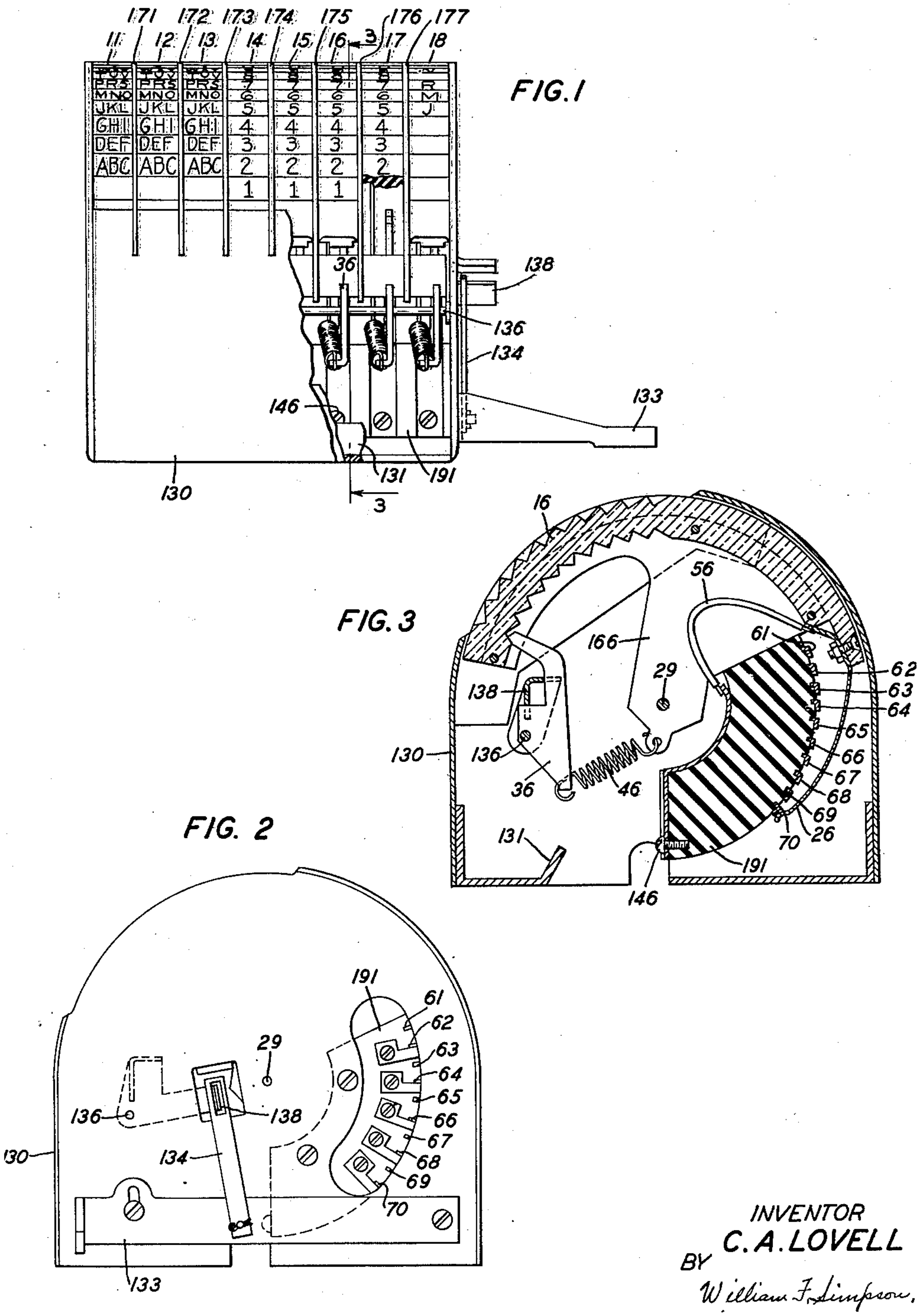
Fig. 1 is a front view, partially broken away, of the dialing apparatus.
Fig. 2 is a side view of the same apparatus.
Fig. 3 shows a section taken along line 3—3 of Fig. 1.

The manner in which the apparatus disclosed in this application may be incorporated in a complete telephone system is disclosed in copending application Serial No. 35,925 of W. A. Malthaner filed June 29, 1948. Suitable types of equipment for responding to the signaling pulses transmitted from the apparatus disclosed herein are disclosed in the copending applications of H. E. Vaughan Serial No. 35,911, filed June 29, 1948; and W. A. Malthaner, N. D. Newby and H. E. Vaughan Serial No. 35,924, filed June 29, 1948.

A similar signaling device is disclosed in co-pending applications Serial No. 35,930 of D. B. Parkinson, filed June 29, 1948; Serial No. 35,927 of C. A. Lovell et al., filed June 29, 1948, now Patent No. 2,588,397, granted March 11, 1952; and Serial No. 35,926 of C. A. Lovell and D. B. Parkinson, filed June 29, 1948, now Patent No. 2,587,635, granted March 4, 1952. Novel features disclosed but not claimed herein are claimed in different ones of the above-identified applications.

In the exemplary embodiment shown, provision is made for the generation of pulse representations of eight characters during each cycle of operation, and these pulses are repeatedly generated as long as the excitation current is applied. Any arbitrarily chosen number of representations of characters (within reasonable limits) may be generated by properly designed signaling apparatus. A maximum of eight representations of characters was selected for this disclosure since eight-character calling numbers are in common use in telephone systems. It will be understood that these characters may be digits or letters or a combination of the two as commonly used in designating telephone calls. Each of the digits 0 to 9 will be represented by a different combination of two pulses; the pulse combination representing the digit 2 will also represent the letters A, B and C; the pulse combination representing the digit 3 will also represent the letters D, E and F; and so on. Hereinafter each combination of eight characters will be referred to as each called number irrespective of whether the combination comprises digits or letters and digits.

In accordance with an exemplary embodiment of this invention, each of the pulses generated is of about 1 millisecond in duration. When pulses of this duration are transmitted over various types of voice frequency communication paths encountered in telephone systems, about 3½ milliseconds are required for the longest transients to die out sufficiently so that the succeeding pulse may be accurately recognized without interference from the transient caused by the previous pulse. In other words each transmitted pulse of approximately 1-millisecond duration is in effect lengthened to a decaying alternating current of approximately 3½-millisecond duration. At the end of this 3½-millisecond period or any time thereafter a second pulse may be transmitted.

The signaling system employed in this embodiment of the invention comprises a start pulse of 1-millisecond duration for each character, the start pulses being generated at 12½-millisecond intervals as long as the pulsing transformers are energized, and a stop pulse of 1-millisecond duration for each character, each stop pulse reaching its peak value during the 4- to 8½-millisecond intervals of time after the start pulse has reached its peak value. In order to provide sufficient margins of safety to permit reliable signaling, 4 milliseconds are allowed for the decay of each pulse and the times of the start of transmission assigned to stop pulses representing digits of successive magnitudes differ by ½ millisecond. Thus, digit 1 is represented by a start pulse followed by a stop pulse which reaches its peak value 4 milliseconds after the start pulse reaches its peak value, digit 2 is represented by a start pulse followed by a stop pulse which reaches its peak value 4½ milliseconds after the start pulse reaches its peak value, and so on. It will be observed that the stop pulse for the digit 0 reaches its peak value 8½ milliseconds after its start pulse and 4 milliseconds before the next succeeding start pulse. Thus, there is required an increment of time of 4 milliseconds for the decay of the start pulse, 9 increments of time of ½ millisecond each for the generation of a pulse at any one of the ten times necessary to represent the various digits, and a last increment of time of 4 milliseconds, all of the latter being required to permit a stop pulse to decay only if it should occur at the end of the ninth increment of time. Consequently, 12½ milliseconds of time elapse between the start pulses of succeeding digits, from which it follows that 12½ milliseconds is required in this exemplary system to transmit each character designating the called number.

In order to indicate the starting point of the transmission of a called number, a time interval of approximately 12.5 to 37.5 milliseconds during which no pulses are transmitted is provided at the beginning of each pulse group representation of a called number. Thus, a time interval of approximately 112.5 to 137.5 milliseconds is required to transmit each eight-digit called number and the corresponding no-signal period.

In accordance with this exemplary embodiment of the invention the signaling pulses are generated by saturation-type pulse generating transformers. There are eleven pulsing transformers, one for each of the numerals 0 to 9 and one for the start or reference pulse. The excitation current for the apparatus may be obtained locally at the subscriber's station or, as in the exemplary embodiment set forth herein, the excitation current for the pulse coils is transmitted from the central office over the line which interconnects the signaling station with the central office. This current is an alternating current of substantially sinusoidal wave form, and at the signaling station the current is passed through a phase shifting network so that the current is converted to a two-phase source in which the two currents are 90 degrees out of phase.

Each of the pulse generating transformers has a single winding secondary and two primary windings. The primary windings of the transformers are serially interconnected and connected with the two phases of the excitation current so that one phase of the excitation current is applied to one primary winding of each transformer and so that the other phase of the excitation current is applied to the other primary winding of each transformer. The secondary windings of the transformers are connected across the line through a selector switch and distributor.

The magnetic core of each transformer is designed to be saturated except for very small values of ampere-turns, and an electric pulse is generated in the secondary winding of each transformer when the flux is changed from saturation at one polarity to saturation at the other polarity. The flux generated in the core of each transformer with two primary windings depends upon the number of turns in the two primary windings of the transformer and upon the current flowing in each winding. In the present embodiment of the invention the maximum value of the currents in the circuits associated with each phase is equal. Thus, the flux generated in the core of each transformer with two primary windings depends upon the number of turns in the primary windings of the transformer and upon the time-phase relationship between the currents flowing in the primary windings. The pulse attains a maximum value when the flux becomes zero.

For the exemplary signaling system described in detail herein it is necessary that all pulses be substantially alike as to wave form and amplitude and that each combination of two pulses representing a digit be of the same polarity. The area under a voltage-time curve representing the pulse is proportional to the total change in flux and to the number of turns in the secondary winding. High intensity energization will produce a high, short pulse, while lower energization will produce a wider pulse having the same area. Thus if all pulses are to be alike the total maximum ampere-turns on each core should be equal. Assuming equal maxima in the currents of the two phases and a 90-degree phase displacement then for pulses of equal amplitude and shape the turns $N_A$ and $N_B$ of the two primary windings of each of the transformers must be such that $$\sqrt{N_{A_1}^2+N_{B_2}^2}=\sqrt{N_{A_2}^2+N_{B_2}^2}= \ldots =\text{a constant}$$

where $N_{A1}$, $N_{A2}$, etc. are the number of turns in the primary winding of the transformers which is connected to phase A of the excitation current and $N_{B1}$, $N_{B2}$, etc. are the number of turns in the other primary winding of the same transformers which is connected to phase B of the excitation current. If these conditions are met and if the cores and secondary windings of all the transformers are alike the pulses will be suitable for signaling purposes.

In order to cause each transformer to generate a pulse at a suitable time during each half cycle of the excitation current, the total ampere-turns driving flux through the transformer cores must be controlled so that the flux in each transformer is zero at the time assigned to the pulse which that transformer serves to generate. This means that $$N_A I_A - N_B I_B = 0$$

must be satisfied at the time the pulse is a maximum, where $N_A$ and $N_B$ are as defined above and $I_A$ and $I_B$ are the currents through $N_A$ and $N_B$, respectively. If each phase of the excitation current is of sinusoidal wave form and both phases of equal maximum amplitude, then the timing is determined by the turns ratio as follows:

$$I_A = I_0 \cos \omega t$$

$$I_B = I_0 \sin \omega t$$

and substitution gives $$N_A I_0 \sin \omega t - N_B I_0 \cos \omega t = 0$$

or $$\frac{N_B}{N_A} = \tan \omega t$$

where $I_A$, $I_B$, $N_A$ and $N_B$ are as defined above, $I_0$ is the maximum current supplied by each phase of the excitation current, $\omega$ equals the frequency in cycles per second multiplied by $2\pi$, and $t$ is the time in seconds.

Thus, when the angular position of the desired pulse is fixed in relation to each half cycle of the excitation current, the number of turns and the polarity of the winding are given by these equations.

Since the magnetic flux in each transformer is reduced to zero two times during each cycle of the excitation current, it follows that a combination of two pulses representing a digit must occur during each half cycle of the excitation current and that each combination of two pulses representing a digit are of opposite polarity to the preceding two pulses.

Pulsing transformers 40 and 50 through 59, inclusive, are interconnected so that the A windings of the transformers are connected in series and connected to the excitation current through phase shifting network 41 and so that the B windings of the transformers are connected in series and connected to the excitation current through phase shifting networks 42 and 43. The phase shifting networks are of conventional design and serve to apply an alternating current to the A windings of the transformers which is displaced 90 degrees in time-phase relationship from the alternating current applied to the B windings of the transformers. Transformers 40 and 50 through 59, inclusive, contain two primary windings and these transformers serve to generate the stop or digit pulses.

Figure 6:
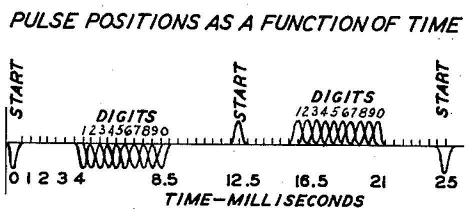
Figs. 6, 6A, 6B, 6C, 6D and 6E illustrate typical wave forms of the applied alternating current or flux produced thereby and typical wave forms of pulses generated by the pulse generating equipment.
Figure 6A:
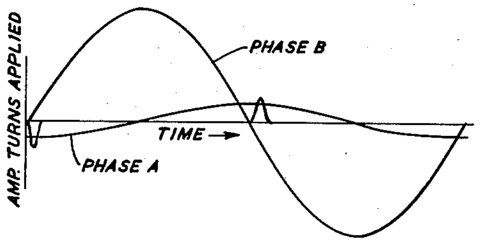

As discussed hereinbefore, each of the transformers 40 and 50 through 59, inclusive, is designed so that its core is saturated except for very small values of flux. Thus, a short pulse is generated in the secondary winding of each transformer when the flux in the core of that transformer passes through zero magnitude. These pulses are illustrated in Fig. 6 which shows the various pulse positions as a function of time. Fig. 6A indicates the ampere-turns applied to the core of transformer 40 as a function of time and shows the time-phase relationship between the start pulses and the ampere-turns applied to this transformer.

Figure 6B:
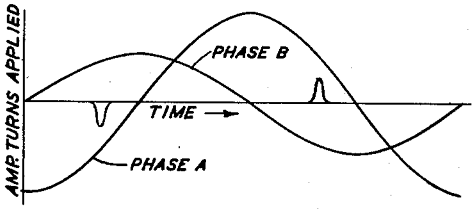
Figure 6C:
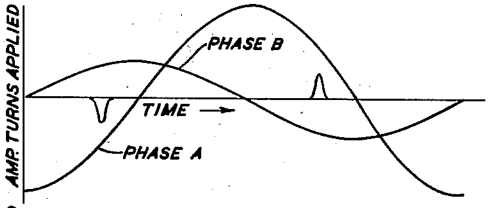
Figure 6D:
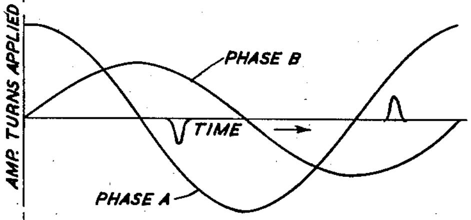

Since transformers 40 and 50 through 59, inclusive, are connected to both phases of the excitation current, the ampere-turns generated in each transformer will equal the summation of the ampere-turns generated by each phase winding. As discussed hereinbefore, since the maximum value of the current in each phase is equal and since the time-phase relationship between the two alternating currents is fixed, the time at which the summation of the ampere-turns and consequently the flux in each transformer passes through zero magnitude is governed by the number of turns in each phase winding. Fig. 6B indicates the ampere-turns generated in each phase winding of transformer 51 as a function of time and shows the time-phase relationship between the stop pulses representing the digit 1 and the ampere-turns generated in each phase winding. Figs. 6C and 6D indicate the time-phase relationships for the generation of stop pulses representing the digits 2 and 0, respectively. In each case the stop or digit pulse voltage is induced in the output winding when the summation of the ampere-turns in both windings equals zero, in each case a start pulse and the stop pulses are induced during each complete half cycle of the applied alternating current, and in each case the pulse is of opposite polarity to the preceding pulse as induced by the same transformer. It will be apparent that the particular phase relationships indicated are arbitrary and that other relationships would serve equally well.

As shown in Fig. 1, each pulsing transformer is connected to lines 73 and 74 through condenser 72. This condenser is proportioned to the iterative impedance of the line and to the impedances of the secondary windings of coils 40 and 50 through 59, inclusive, so that each half-cycle pulse as generated by a transformer is applied through condenser 72 to the line as a complete cycle of alternating current of substantially sinusoidal wave form, and the period of each complete cycle of alternating current is equal to the time required for each half-cycle pulse as generated by the transformers.

Figure 6E:
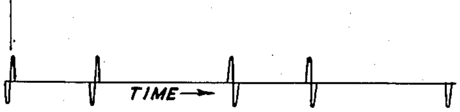

Fig. 6E indicates the start pulses and pulses representing the digit 2 as applied to the line during one cycle of the excitation current. Fig. 6E in conjunction with Figs. 6A and 6C indicates the relationship between the pulses as generated in the transformers and the pulses as applied to the line.

An excitation current which alternates at the rate of substantially 45 cycles per second is employed for this embodiment of the invention. However, it will be apparent that other frequencies would serve equally well.

The primary windings of each of the transformers 50 through 59, inclusive, are proportioned so that each transformer generates a stop pulse corresponding to the digit assigned to that transformer. Thus, each of these transformers generates a pulse which reaches its peak value at a time during the 4½-millisecond interval assigned to stop or digit pulses and there is a ½-millisecond time interval between the peak values of each pulse generated.

During the time that the excitation current is applied to the pulsing transformers a pulse is generated in the secondary of each of the transformers during each half cycle of the excitation current. In order to supply the pulses to the line comprising conductors 73 and 74 in conformity with the called number which it is desired to transmit, selector switch 130 and a distributor are employed to interconnect the transformers with the line.

Figure 4:
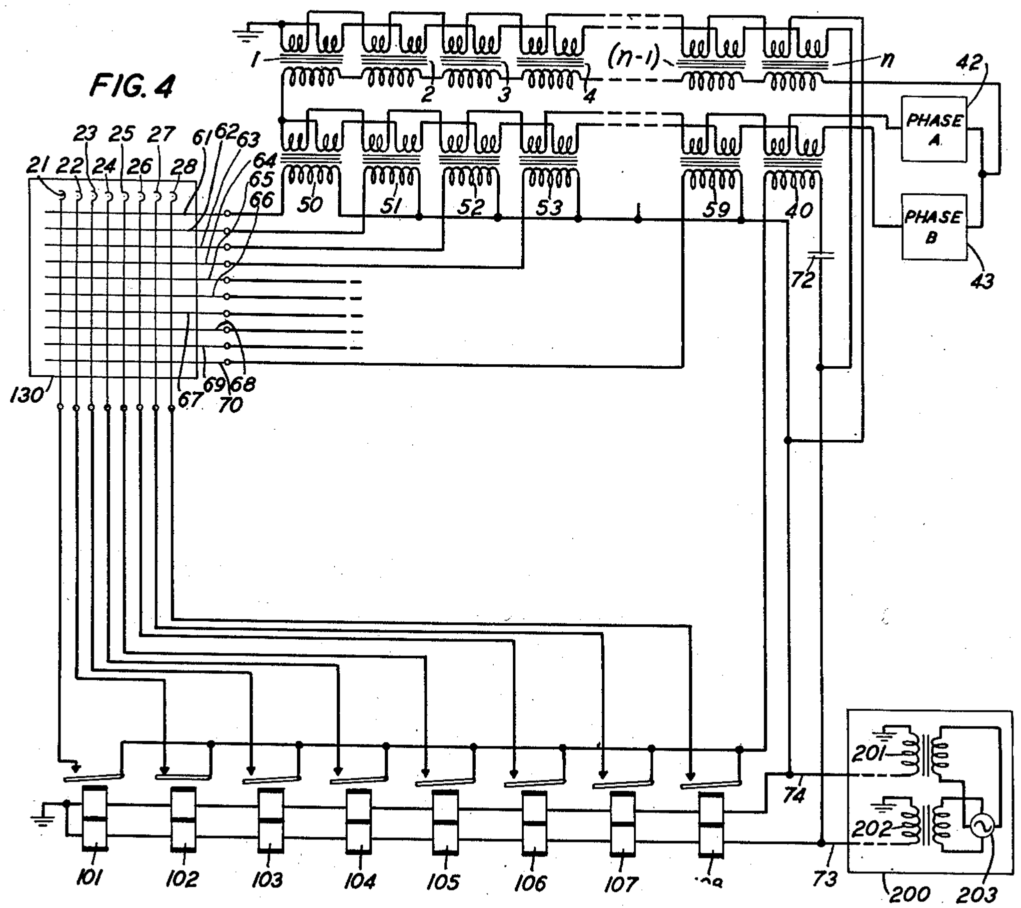
Fig. 4 shows the manner in which the dialing apparatus, the stepping mechanism, the pulse generating coils or transformers, the harmonic generator, and other equipment are interconnected to cooperate one with another and with the telephone line.

In accordance with the present invention a simplified relay distributor is provided comprising a relay for each of the digits of the called subscriber's station number or designation. In the exemplary embodiment shown herein it is assumed that it is desired or necessary to transmit eight digits for each calling subscriber's station designation. Consequently, eight reed-type relays are provided. These relays are interconnected with the selector switch 130 and the pulse generating transformers described above. As shown in Fig. 4, each of these relays comprises a single armature and contact, and two windings. The windings are proportioned in the manner similar to that described above with reference to the various pulse generating coils so that the contacts are actuated or closed once during each half cycle of the applied alternating current but at different times for each of the different relays. Typical examples of relays suitable for the relays of the distributor comprising relays 101 through 108, inclusive, are described in Patents 2,264,124 granted to Schreiner, November 25, 1941, and 2,264,746 granted to Ellwood, December 2, 1941. Each of these patents discloses a reed-type relay which normally has a normally closed contact or circuit therethrough which contact is opened or circuit through it is interrupted upon the application of a magnetic field to the relay as, for example, by an electric current flowing through a coil which surrounds the contact structure. In addition, the contact is broken by magnetic fields in either or both directions. Thus when the winding is supplied with alternating current the contact opens during each half cycle of the applied alternating current and closes for a short interval of time each time the field passes through zero when the alternating current changes from one polarity to the other.

Figure 5:
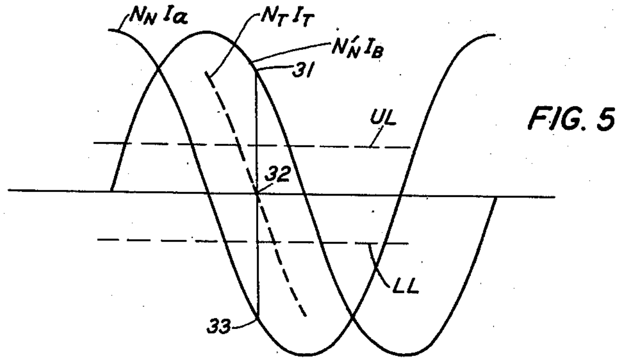
Fig. 5 shows curves explaining the operation of the improved relay stepping distributor in accordance with the present invention.

As shown in Fig. 4 these relays are each provided with two windings and each winding is connected to one of the line conductors 73 or 74 extending to a control center 200 or other suitable source of two-phase alternating current. As shown in the drawing a two-phase source 203 is provided at the control center and one phase is connected through transformer 201 to line conductors 74 and then through the upper windings of each of the relays 101 through 108 to ground. Similarly, another phase is connected to the transformer 202 to the line conductor 73 and the lower windings of the relays 101 through 108 to ground. The application of the alternating current to the windings of these relays causes the relays to operate and interrupt the back or break contacts except for short intervals of time during which the total flux produced by both windings passes through zero. The time the flux through the various relays passes through zero during each half cycle of the applied alternating current is adjusted by controlling the number of turns upon each winding and the current through the windings. For purposes of illustrations it is assumed that the current through each winding will have the same maximum value and that the phase relationship between these currents is 90 degrees. Fig. 5 shows such a relationship between the currents supplied to the two windings. Also, Fig. 5 illustrates that when the ampere turns in one winding $N_N I_A$ is equal and opposite to the ampere turns in the other winding $N'_N I_B$ the total flux, which is proportional to the algebraic sum of the ampere turns due to the two windings and illustrated by the dash line $n_t\, i_t$, passes through zero. Thus when the number of ampere turns produced the phase A, that is, the upper windings of these relays is equal and opposite to the flux and thus the total number of ampere turns produced by the lower windings of one of these relays such as illustrated at points 31 and 32. The resulting flux will be zero as illustrated at 32.

Furthermore, the time during which the contacts remain closed may be adjusted by adjusting the total maximum flux through the relay. If it is assumed that the relay is released between the limits of UL and LL as shown in Fig. 5, the time required for the flux through the relay to pass through these limits is determined by the total maximum flux applied to the relay. Thus if the flux is very much greater than these limits the time the relay remains on its back contact is a very small portion of the entire applied alternating-current cycle. On the other hand, if the total applied flux does not greatly exceed the limits shown in Fig. 5, the relay contacts will remain closed for an appreciable portion of each of the half cycles of the applied alternating current.

In order that the time of closure of each of the contacts of the relays be substantially the same, it is desirable that the total flux applied to each of the relays be substantially the same. Consequently, as in the case with the pulse transformers or coils 40, and 50 through 59 and again assuming that the maximum current from each phase is substantially the same and that the two currents are displaced by a phase displacement of 90 degrees, then the square root of the sum of the squares of the turns in the two windings of each relay should all be the same. Furthermore, as pointed out above, it is desirable to provide a blank interval between pulses representing a complete subscriber's station designation. Consequently, the time at which the flux passes through zero for each of the relays is adjusted so that during the blank interval of a suitable or desired duration all of the relay contacts remain open. In other words the flux does not go through zero in any of the relays during this blank interval.

As pointed out above, a silent or blank interval is transmitted between each applied designation and, inasmuch as a half cycle of the energizing current for the pulse generating coils is required to transmit a pulse representing any one of the different magnitudes, it is necessary that the frequency of the alternating source supplying the pulse generating coils must be at least nine times the frequency supplied to the relay stepping circuit.

In accordance with the present invention, a frequency or harmonic generator in accordance with an application of Lovell and Parkinson, Serial No. 68,555, filed December 31, 1948, now Patent No. 2,580,446, granted January 1, 1952, is provided and energized over the subscriber's line. This harmonic generator is arranged to generate a frequency nine times or eleven times or some other suitable multiple of the supplied frequency and the output of this harmonic generator is employed to energize the pulse generating coils or transformers in the manner described above. The phase shifting networks are provided to secure the desired phase difference between the current supplied to the two different input windings on each of the pulse generating coils.

A transformer for an impulse coil 1, 2, 3, 4, $n-1$ and $n$ shown in Fig. 4 is provided for each cycle of the harmonic current desired. Thus, if the ninth harmonic is required $n$ will be nine and nine coils will be provided in the harmonic generator. If it is desired to employ the eleventh harmonic instead of the ninth, then eleven coils will be provided in the harmonic generator. Each of these coils is provided with two windings similar to the windings of the impulse coils 40 and 50 through 59 and each of the relays 101 through 108. Likewise, the ratio of turns on each of the coils is adjusted so that the flux through the coil passes through zero at the proper time to produce a pulse in the output circuit. In this case the times at which the flux passes through zero are uniformly distributed during each of the half cycles of the alternating current, so that substantially all the current induced in the output circuit will have a frequency of the desired harmonic.

The output from these coils is applied through the phase splitting or adjusting networks 42 and 43 which are employed to derive currents of two different phases for energizing the impulse coils 40 and 50 through 59, inclusive, in the manner described above.

Figs. 1, 2 and 3 indicate one embodiment of the manual selector switch. It is enclosed in case 130, and selector dials 11 to 18 and release lever 133 are accessible to an operator. The selector dials are made of a non-conducting material such as hard rubber or plastic, and each dial is provided with ten indentations along the outer periphery. Each indentation is designated by a letter or number conforming to the telephone signaling system, and each is of suitable configuration to permit an operator's finger to engage and move the dial. The selector dials are separated by spacers 171 to 177 which are attached to case 130. As indicated in Fig. 3, each dial is attached to an individual support 166 so that each dial may be moved approximately one-fourth of a revolution about shaft 29. The inner surface of each dial is provided with ten grooves which correspond to the finger indentations on the outer periphery of the dial. The grooves on each dial serve to engage with a detent pawl to secure each dial in one of the ten possible positions as selected by the operator. As indicated in Fig. 3, detent pawl 36 which corresponds to dial 16 is pivoted about shaft 136. Spring 46 is attached between support 166 and pawl 36 so that pawl 36 is normally forced against dial 16, thereby securing the dial in a fixed position by engaging with one of the ten grooves. Spring 46 also serves to apply a continuous force to support 166 which tends to rotate support 166 and dial 16 in a clockwise direction about shaft 29. The grooves on the dials and the detent pawls are shaped and positioned so that by pressing upon the finger indentations in a dial an operator can move the dial in either direction and so that the ratchet action of the pawl against the grooves secures the dial in any one of the ten positions to which it may be moved. The rotary movement of the dials is limited to about one-fourth of a revolution by stop 131 and insulator 191.

Release arm 138 is connected with release lever 133 through lever 134 and is provided with slots to engage each detent pawl. When lever 133 is in its normal position, arm 138 permits each detent pawl to engage with a groove in the corresponding dial. When lever 133 is depressed, arm 138 is moved in a clockwise direction, as viewed in Figs. 2 and 3, about shaft 136 and the detent pawls are disengaged from the dials, thereby permitting the spring associated with each dial to cause each dial to return to its initial position.

A spring contact is connected to each dial, and each dial and spring contact may be moved so that the spring contacts may be connected with any one of ten conductors. As indicated in Fig. 3, spring contact 26 is attached to dial 16 and it is electrically connected to terminal 146 through conductor 56. Insulator 191 supports the various terminals and conductors, and the ten conductors 61 to 70 which may be contacted by spring contacts 21 to 28 are mounted thereon.

In operating the calling device in accordance with this invention the subscriber will first position the dial or finger wheels 11 through 18 in accordance with the digits, characters or symbols of the called subscriber's station designation or number. Actuation of these wheels will cause the contact members 21 to 28, inclusive, to selectively make contact with the bus bars 61 through 70, and thus connect the output windings of the pulse coil transformers 50 through 59 selectively to contacts of the relays 101 through 108 in accordance with the identities of the digits or symbols in the various positions of the called subscriber's station number or designation. Thereafter the subscriber will initiate a call which in turn causes alternating-current power to be applied to the line conductors 73 and 74 at the control station 200. The above-identified applications of Malthaner illustrate typical control station equipment for applying alternating currents to the subscriber's line. In this case, however, as shown in the exemplary embodiment shown in Fig. 4 alternating current of one phase is applied to one line conductor and alternating current of another phase applied to another line conductor If desired, the alternating current may be applied to both conductors as set forth in the above-identified applications of Malthaner et al. and phase controlling networks provided to the subscribers for deriving two phases of alternating current from a single phase current supplied over the simplex system. However, in accordance with the exemplary embodiment described in detail herein, it is assumed that the alternating current of two different phases will be applied to the two different line conductors.

Application of this alternating current will cause all or all but one of the relays 101 through 108 to be operated depending upon the relative phases of the two different currents applied to the line conductors 73 and 74. By properly selecting the phase first applied to these conductors, it is possible to start the operation of the distributor at any desired point by having any desired one of the relays first close its contacts or not open its contacts in response to the application of the alternating current to the line. Likewise, the application of the alternating current to the line energizes the harmonic generator which comprises coils 1 through *n*, inclusive, which coils in turn generate harmonic current which current is employed to provide a two-phase higher frequency current for operating the impulse coils 40 and 50 through 59, inclusive.

Assume for example, that upon the application of the alternating current to the line relay 102 either does not open its contacts or shortly thereafter recloses them and connects the output or stop pulse coil to which the contact spring 22 is connected in series with the output of the start pulse coil 40 and condenser 72 to the line conductors 73 and 74. If the harmonic generator and impulse coils have insufficient time to become properly energized and generate the proper pulses this time no pulse or improper pulses may be transmitted. However, such improper pulses will not interfere with the operation of the system because they are employed to merely control the level of the amplifying equipment and other receiving apparatus at the control station. If, however, these other devices are properly energized at this time proper pulses will be transmitted representing the identity of the second one of the numerals or symbols of the second digit of the called subscriber's station number or identification. A short time thereafter, namely, during the application of the next half cycle of the harmonic current applied to the pulse coils 40 and 50 through 59, relay 102 operates and interrupts the circuit through its contacts, and relay 103 releases because the flux through this relay will now pass through zero, while the flux applied to the magnetic structure of relay 102 becomes sufficiently great to cause these contacts to be operated and thus disconnect the circuit of the contact member 22. Release of relay 103 connects the contact member 23 in series with the output winding of the impulse coil 40 and condenser 72 to the line conductors 72 and 73 thus providing a circuit for the transmission of a start pulse and subsequent stop pulse in accordance with the setting of the third dial or finger wheel 13. In a similar manner pulses representing each of the digits of the called subscriber's station number or identification are transmitted. After relay 108 is released and reoperated all of the relays 101 through 108 remain operated for one or more cycles of the alternating current applied to the impulse coils 40 and 50 through 59, inclusive. Thereafter relay 101 will again close its contacts and cause the transmission of pulses of the type described above representing the first digit of a complete subscriber's designation to the central control station over conductors 73 and 74. The above cycle of operation is then repeated as long as alternating current is supplied to the subscriber's line at the control station 200, thus causing the pulses representing the complete subscriber's station designation to be repeatedly transmitted to the central switching station as long as required for controlling the switches and other equipment at said central switching station. It is to be understood that the above-described exemplary arrangements are illustrative of the application of the principles of this invention. Numerous other arrangements and modifications may be devised by those skilled in the art without departing from the spirit and scope of the invention.

What is claimed is:

1. A telephone calling system comprising a subscriber's line, apparatus for generating two pulses for each digit representing a number comprising a plurality of impulse coils for generating start and stop pulses, apparatus for supplying said coils as polyphase alternating currents comprising a harmonic generator, connections for supplying power to said generator from said subscriber's line and a selecting device for selecting the desired stop pulse comprising in combination a manual selecting device and a plurality of relays actuated one at a time by polyphase alternating currents of the same frequency as applied to said harmonic generator.

2. A telephone calling system comprising in combination subscriber line terminals, an electromagnetic relay distributor having a plurality of double wound relays, connections from each of said relay windings to one of said line terminals, means for supplying polyphase alternating current to said line terminals, a harmonic generator comprising a plurality of double wound impulse coils having saturable cores, connections between said line terminals and said impulse coils for energizing each of said coils by two different phases of said polyphase alternating current, a plurality of pulse coils for generating a start and a stop pulse for each digit of a called designation, connecting means for energizing said pulse coils from said harmonic generator, and a manually selecting device for selectively connecting said pulse coils to said relays and to said line terminals.

CLARENCE A. LOVELL.

REFERENCES CITED

The following references are of record in the file of this patent:

UNITED STATES PATENTS

| Number | Name | Date |
|---|---|---|
| 2,451,489 | Joel | Oct. 19, 1948 |
| 2,499,606 | Parkinson | Mar. 7, 1950 |